United States Patent [19]

Zorn

[11] Patent Number: 5,642,988
[45] Date of Patent: Jul. 1, 1997

[54] RADIAL PISTON PUMP

[75] Inventor: Helmut Zorn, Herzogenaurach, Germany

[73] Assignee: INA Walzlager Schaeffler KG, Germany

[21] Appl. No.: 561,446

[22] Filed: Nov. 21, 1995

Related U.S. Application Data

[63] Continuation-in-part of Ser. No. 484,586, Jun. 7, 1995, abandoned, which is a continuation of Ser. No. 72,594, Jun. 4, 1993, abandoned, which is a continuation of Ser. No. 896,109, Jun. 9, 1992, abandoned.

[30] Foreign Application Priority Data

Feb. 15, 1991 [DE] Germany ............ 42 04 631.9

[51] Int. Cl.$^6$ ............................................. F04B 27/04
[52] U.S. Cl. ............................................. 417/273
[58] Field of Search .................................... 417/273

[56] References Cited

U.S. PATENT DOCUMENTS

| | | | |
|---|---|---|---|
| 3,777,622 | 12/1973 | Hause et al. | 417/273 X |
| 4,968,220 | 11/1990 | Filippi et al. | 417/273 |
| 4,975,025 | 12/1990 | Yamamura et al. | 417/273 |
| 4,977,606 | 12/1990 | Budecker | 417/273 X |
| 4,983,100 | 1/1991 | Budeck et al. | 417/271 |
| 5,230,275 | 7/1993 | Hodge et al. | 417/273 |

FOREIGN PATENT DOCUMENTS 3808901  10/1989  Germany.

OTHER PUBLICATIONS

Stewart, Pumps, pp. 193, 199–200, Theodore Audel & Co., Indianapolis IN, 1978.

*Primary Examiner*—Richard E. Gluck
*Attorney, Agent, or Firm*—Bierman, Muserlian and Lucas LLP

[57] ABSTRACT

A radial piston pump (1), preferably for pressure medium supply of an anti-lock system of vehicle brakes, with a rotating pump shaft (3), an end section of which has a pivot (5) extending eccentrically to a longitudinal center axis of the pump shaft (3), there being arranged on the pivot (5) a rolling bearing on whose outer ring (9) are supported by their plane end faces (13) pump plungers (12) in star arrangement in a pump housing (2) and extending radially to the pump shaft (3), characterized in that the rolling bearing is designed as a needle bearing (6) with the needle elements rolling directly against the shaft pivot (5), the outer ring (9) being produced as a deep-drawn sheet metal ring with chiplessly formed edges (10,11) on both sides, in which needle-shaped rolling elements (7) are guided via a cage (8) and in which the outer ring (9) is made with a core hardness of at least 300 HV1.

3 Claims, 3 Drawing Sheets

RADIAL PISTON PUMP

This application is a continuation-in-part of U.S. patent application Ser. No. 484,586 filed Jun. 7, 1995, now abandoned, which is a continuation of U.S. patent application Ser. No. 072,594 filed Jun. 4, 1993, which is a continuation of U.S. patent application Ser. No. 896,109 filed Jun. 9, 1992, now abandoned.

STATE OF THE ART

Radial pumps with a rotating pump shaft, preferably used to supply a pressure medium to an antilocking system for vehicle brakes in which the end section of the pump shaft has a pivot, which proceeds eccentrically with respect to the longitudinal center axis of the shaft and a rolling bearing is located on the shaft pivot, and pump plungers are arranged in a star-shaped pattern within a pump housing, proceeding radially with respect to the pump shaft, with their end faces resting against the outer ring of this rolling bearing are known from the publication DE-Z "Fundamentals of Hydraulic Service", FOS-400, by Deere & Co., 1977 edition, pages 2–11 and 2–12. In this case, a rolling bearing is located on an eccentric portion of the pump shaft described as a "cam". The outer ring of the this rolling bearing which is machined from a tubular blank, rests with its outside surface against the end faces of the pump plungers. As compared to the use of plain bearings which is also common in radial piston pumps, the use of a rolling bearing of this type with a machined outer ring carries a few serious disadvantages.

As a result of the irregular rotation of its mass when used in a radial piston pump which is operated at high rotational speeds, the relatively thick-walled outer ring leads to a considerable increase in the forces of mass at the eccentric drive element. For this reason, there has been a preference for the use of plain bearings in radial piston pumps which are accelerated to, and operated at, high rotational speeds. Furthermore, the rolling bearing requires a relatively large amount of room because of its thick-walled outer ring. With respect to manufacturing costs, the bearing also compares unfavorably with the plain bearing.

OBJECTS OF THE INVENTION

It is an object of the invention to avoid the disadvantages of known radial piston pumps by creating a rolling bearing arrangement on the eccentric portion of the shaft accompanied by low mass forces with good space utilization.

It is another object of the invention to provide an inexpensive rolling bearing arrangement for mass produced radial piston pumps.

These and other objects and advantages of the invention will become obvious from the following detailed description.

THE INVENTION

The radial piston pump of the invention, preferably for pressure medium supply of an anti-lock system of vehicle brakes, with a rotating pump shaft (3), an end section of which has a pivot (5) extending eccentrically to a longitudinal center axis of the pump shaft (3), there being arranged on the pivot (5) a rolling bearing on whose outer ring (9) are supported by their plane end faces (13) pump plungers (12) in star arrangement in a pump housing (2) and extending radially to the pump shaft (3), is characterized in that the rolling bearing is designed as a needle bearing (6) with the needle elements rolling directly against the shaft pivot (5), the outer ring (9) being produced as a deep-drawn sheet metal ring with chiplessly formed edges (10,11) on both sides, in which needle shaped rolling elements (7) are guided via a cage (8) and in which the outer ring (9) is made with a core hardness of at least 300HV1.

In a radial piston pump, a line contact is established between the plane end faces of the pump plungers and the outer peripheral surface of the outer ring. This line contact can lead to a plastic deformation of an outer ring made as a thin-walled deep drawn part, and this deformation can result in destruction of the needle roller bearing after a relatively short time of operation. The invention provides a solution of this problem by the fact that the outer ring has a high core hardness of at least 300HV1.

The rolling bearing has the form of a needle roller bearing whose outer ring is manufactured as deep-drawn sheet metal ring with ribs formed on both sides by non-cutting shaping. By using a needle roller bearing whose needles preferably roll directly against the shaft pivot and whose outer ring takes the form of a thin-walled sheet metal part, the support of the pump plungers against the eccentric can be designed with small radial dimensions. This needle roller bearing whose needle-shaped rolling elements are preferably guided in a plastic cage displays a low mass, so that the eccentric drive allows vibrations in the pump drive to be avoided. It must be noted that in the use of the radial piston pump within an antilocking system, the radial piston pump must briefly provide a build-up of pressure in the hydraulic system and must therefore be accelerated from a standstill to a high rotational speed. During this operation, the forces of mass which occur are reduced in accordance with the invention.

In a further development of the invention, the outer ring of the needle roller bearing is provided with an average surface imperfection depth of $R_a \geq 0.8$ μm on the portion of its outside surface which contacts the end faces of the pump plungers. An outer ring created with this surface imperfection depth is suitable for guiding the pump plungers, because only minor relative motion occurs between the outer ring and the end faces of the pump plungers. In this way, a cost-effective rolling bearing can be provided for a mass-produced radial piston pump used in motor vehicles.

REFERRING NOW TO THE DRAWINGS

Figure 1:
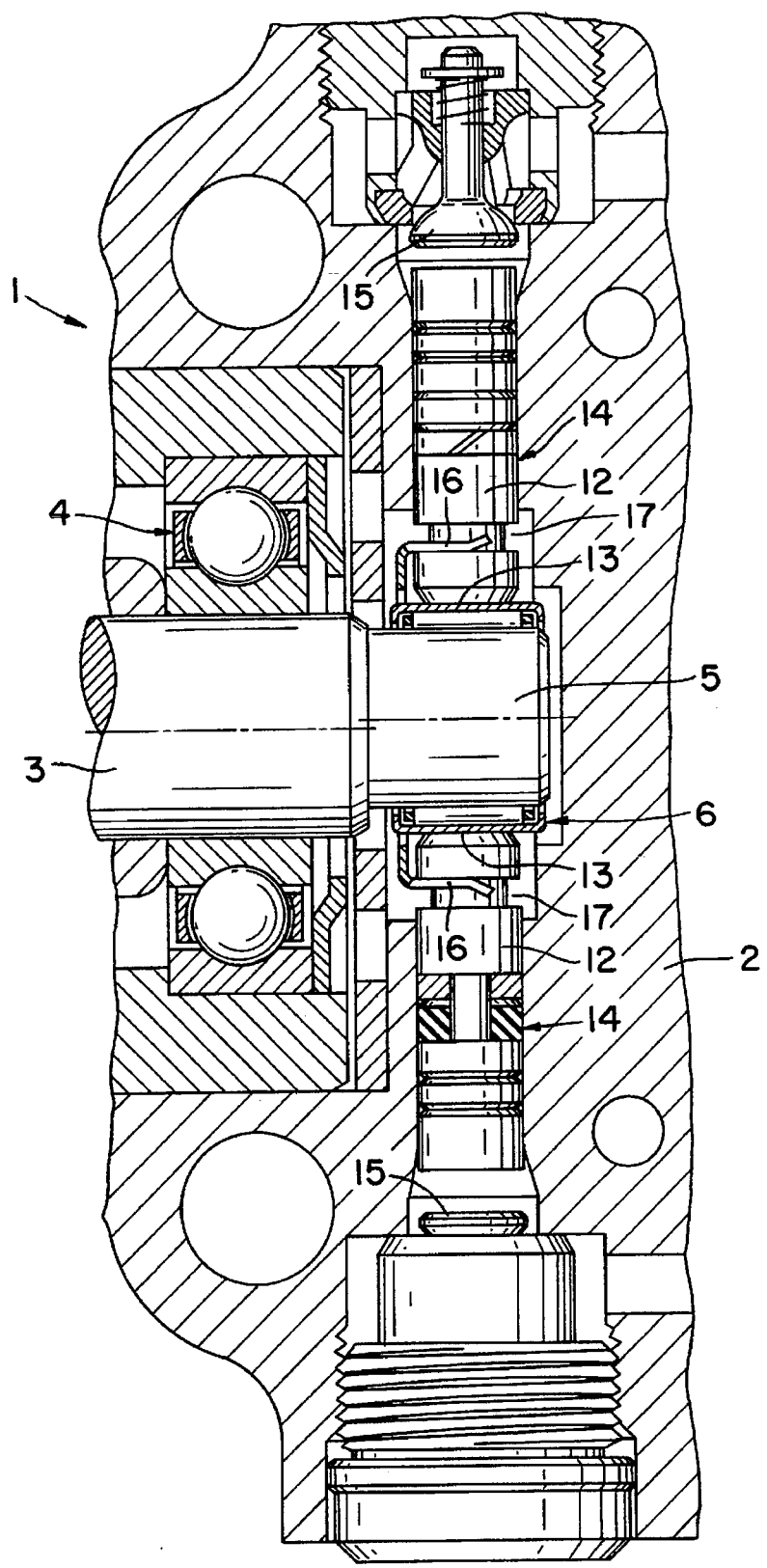
FIG. 1 is a partial longitudinal cross section through a radial piston pump with a needle roller bearing located on the eccentric pivot of a pump shaft.

In FIG. 1, a radial piston pump (1) in whose housing (2) a pump shaft (3) is supported by a ball bearing (4) is shown. The pump shaft (3) has a pivot (5) at its end section which is arranged eccentrically with respect to the longitudinal center axis of the pump shaft (3). Located on this shaft pivot (5) is a needle roller bearing (6) which consists of cylindrical, needle-shaped rolling elements (7), a cage (8) which holds the rolling elements (7), and an outer ring (9) provided with ribs (10) and (11) on its end faces.

Figure 3:
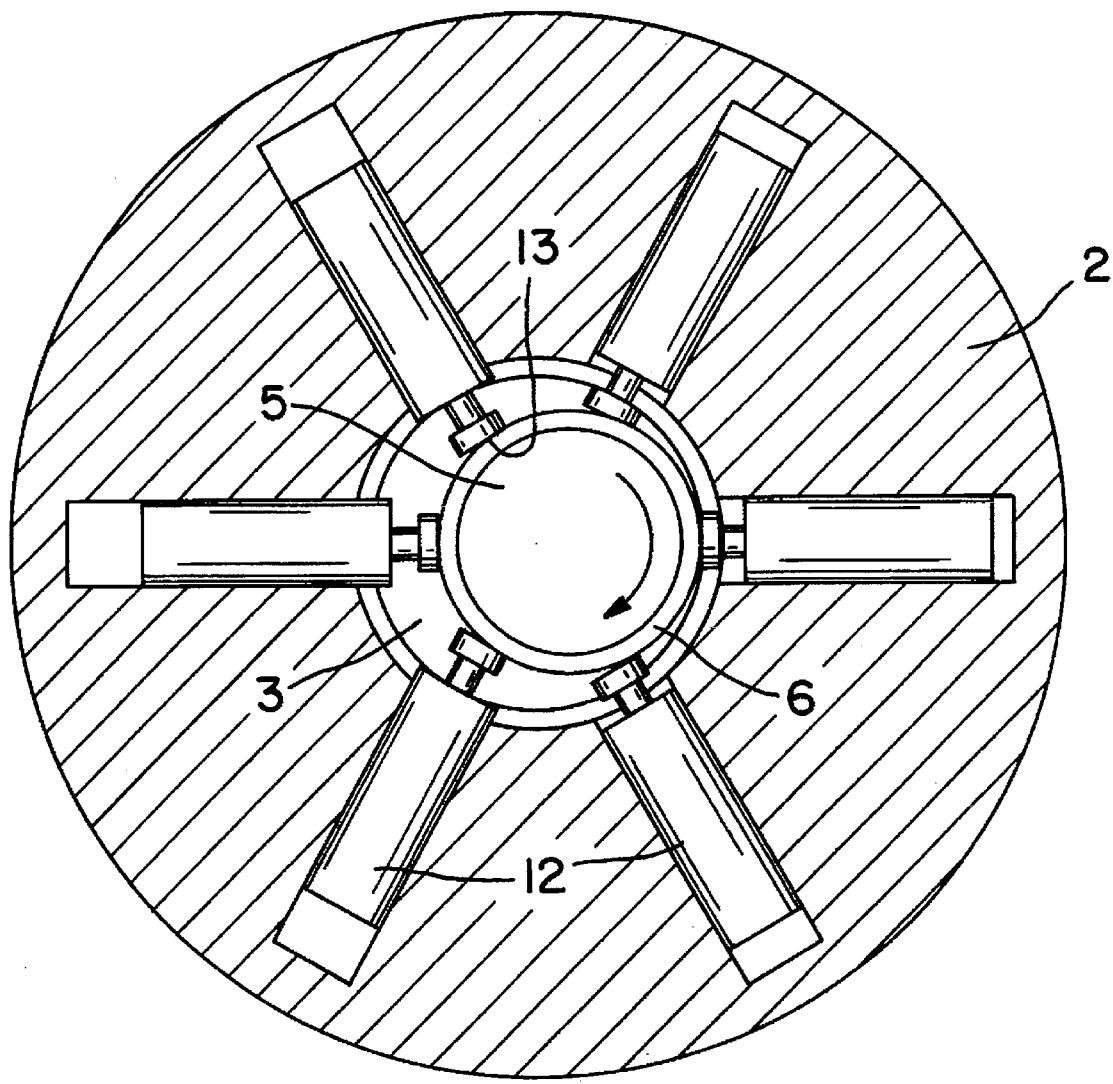
FIG. 3 is a view of the pump plunger in a radial star-shaped arrangement.

Several pump plungers (12) are guided on the outer surface of the outer ring (9). Only two of these pump plungers (12) are visible in the sectional representation and these pump plungers (12) proceed in a radial, star-shaped pattern as shown in FIG. 3 with respect to the outer ring (9) of the needle roller bearing (6) and their end faces (13)

contact the outer ring (9). Each pump plunger (12) is located in a cylindrical pressure chamber (14), which is created directly within the housing (2). As a result of the oscillating motion of the pump plungers (12), a hydraulic pressure medium is sucked through an inlet valve (15), one of which is assigned to each pump plunger (12). The pressure medium is led through holes and pressure lines (not shown in detail) and into the pressure system of an antilocking system for vehicle brakes. Leaf springs (16) are guided on the outer ring (9) and each of these leaf springs catches in the groove (17) of a pump plunger (12). The leaf springs (16) ensure that the pump plungers (12) are constantly guided with their end faces (13) against the outer ring (9).

Figure 2:
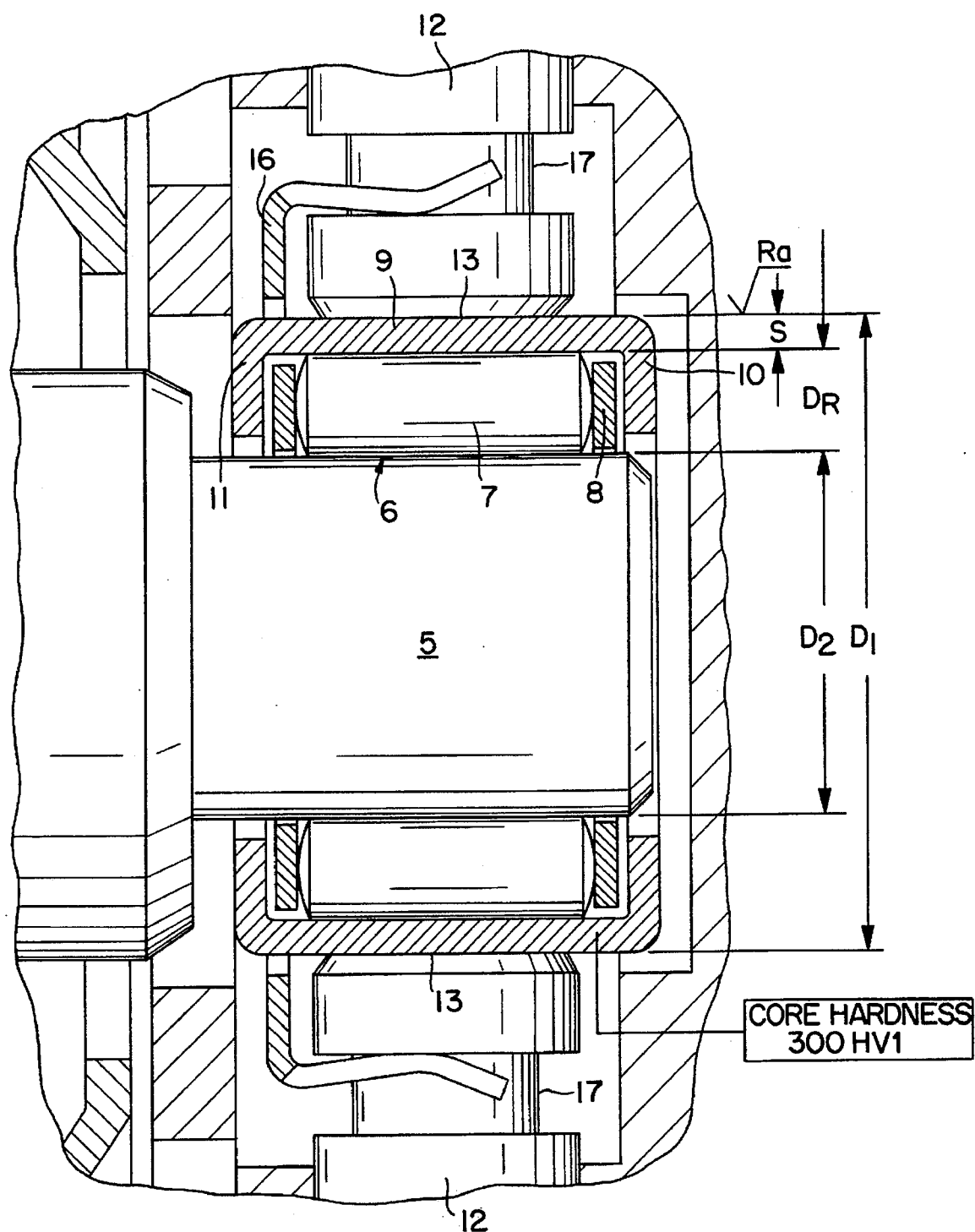
FIG. 2 is an enlarged partial view of the needle roller bearing used in the radial piston pump of FIG. 1.

The design of the needle roller bearing can be seen in FIG. 2. The outer ring (9) of the needle bearing (6) is created as a deep-drawn sheet metal ring, whose ribs (10) and (11) are also created by forming of this very thin-walled sheet metal ring with non-cutting shaping. The surface of the outer ring (9) is not machined after the forming has taken place. As a result of the very thin-walled outer ring (9) and its forming with non-cutting shaping, a cost-effective arrangement for bearing the pump plungers (12) on the eccentric shaft pivot (5) is achieved. This bearing arrangement also features a very low overall height and mass and it is advantageous for the surface of the outer ring (9) to possess an average roughness value of $R_a \geq 0.8$ μm, because the pump plungers (12) execute only minimal relative motion with respect to the outer ring (9). A general hardening of the outer ring (9) is also essential, as this prevents wearing of the ribs (10) and (11) in the event that these ribs collide with the housing (2).

Advantageously, the dimension of the outer ring (9) has a quotient $Q_1$ with respect to a thickness s of the outer ring (9) and an outer diameter $D_1$ of the outer ring (9) is expressed as $Q_1$=s: $D_1$ and is between 0.085 and 0.06. These values for the wall thickness s have the advantage of weight reduction and small radial design space requirements. It has previously been assumed that needle roller bearings with such thin-walled outer rings were not suitable for use in a radial piston group.

In another embodiment, there is a quotient $Q_2$ for a diameter $D_R$ of the roller needles (7) and a diameter $D_2$ of the shaft pivot (5) which is expressed as $Q_2=D_R:D_2$ and is between 0.35 and 0.25. This increases the dynamic load rating of the needle roller bearing by providing needle rollers of relatively larger diameter which compensates for the reduction of the wall thickness of the outer ring as discussed above.

Various modifications of the radial piston pumps of the invention may be made without departing from the spirit or scope thereof and it should be understood that the invention is intended to be limited only as defined in the appended claims.

What is claimed is:

1. A radial piston pump (1), with a rotating pump shaft (3), an end section of which has a pivot (5) extending eccentrically to a longitudinal center axis of the pump shaft (3), there being arranged on the pivot (5) a rolling bearing on whose outer ring (9) are supported by their plane end faces (13) pump plungers (12) in star arrangement in a pump housing (2) and extending radially to the pump shaft (3), characterized in that the rolling bearing is designed as a needle bearing (6) with the needle elements rolling directly against the shaft pivot (5), the outer ring (9) being produced as a deep-drawn sheet metal ring with chiplessly formed edges (10,11) on both sides, in which needle shaped rolling elements (7) are guided via a cage (8) and in which the outer ring (9) is made with a core hardness of at least 300 HV1 and a quotient $Q_1$ out of a thickness "s" of the outer ring (9) and an outer diameter $D_1$ of the outer ring (9) is expressed as $Q_1$=s: $D_1$ and is between 0.085 and 0.06.

2. A radial piston pump of claim 1, wherein the outer ring (9) has, at least on its generated surface facing the plane end faces (13) of the pump plungers (12), a surface roughness of a value between centers $R_a \geq 0.8$ μm.

3. A radial piston pump of claim 1 wherein a quotient $Q_2$ out of a diameter $D_R$ of roller needles (7) and a diameter $D_2$ of the shaft pivot (5) is expressed as $Q_2=D_R:D_2$ and is between 0.35 and 0.25.

* * * * *